(12) United States Patent
Miura et al.

(10) Patent No.: US 8,295,703 B2
(45) Date of Patent: Oct. 23, 2012

(54) OPTICAL TRANSMISSION APPARATUS

(75) Inventors: Akira Miura, Kawasaki (JP); Hiroki Ooi, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 12/585,084

(22) Filed: Sep. 2, 2009

(65) Prior Publication Data

US 2010/0028007 A1    Feb. 4, 2010

Related U.S. Application Data (63) Continuation of application No. PCT/JP2007/055403, filed on Mar. 16, 2007.

(51) Int. Cl.
*H04J 14/02* (2006.01)

(52) U.S. Cl. ............... 398/83; 398/81; 398/84; 398/45

(58) Field of Classification Search ............ 398/83, 398/87, 95, 81, 45, 147, 159, 84, 51, 54
See application file for complete search history.

(56) References Cited

U.S. PATENT DOCUMENTS

| | | | | |
|---|---|---|---|---|
| 6,768,831 | B2* | 7/2004 | Maeda | 385/24 |
| 7,110,674 | B2* | 9/2006 | Nakajima et al. | 398/83 |
| 7,308,197 | B1* | 12/2007 | Zhong et al. | 398/48 |
| 7,583,895 | B2* | 9/2009 | Nakamura et al. | 398/65 |
| 2003/0175029 | A1* | 9/2003 | Harney et al. | 398/83 |
| 2004/0057661 | A1 | 3/2004 | Okuno | |
| 2004/0161241 | A1 | 8/2004 | Tomofuji et al. | |
| 2005/0226629 | A1 | 10/2005 | Ooi et al. | |
| 2006/0045532 | A1 | 3/2006 | Yano | |

FOREIGN PATENT DOCUMENTS

| | | |
|---|---|---|
| EP | 1 583 262 | 10/2005 |
| EP | 1 622 298 | 2/2006 |
| JP | 09-261173 | 10/1997 |
| JP | 2005-295126 | 10/2005 |
| JP | 2006-042012 | 2/2006 |

OTHER PUBLICATIONS

Patent Abstracts of Japan, Publication No. 2006-042012, Published Feb. 9, 2006.
Patent Abstracts of Japan, Publication No. 09-261173, Published Oct. 3, 1997.
Patent Abstracts of Japan, Publication No. 2005-295126, Published Oct. 20, 2005.

(Continued)

*Primary Examiner* — M. R. Sedighian
(74) *Attorney, Agent, or Firm* — Staas & Halsey LLP (57) ABSTRACT

Where add optical signals have k different bit rates, an add controller is connected to k (<N) of N input ports and sends the add optical signals to the k input ports to perform add control. A drop controller is connected to m (<M) of M output ports and performs drop control on optical signals from the m output ports. The k input ports of an N×M wavelength selective switch and the add controller are connected by k links (L1 to Lk) which have introduced therein dispersion compensators for compensating chromatic dispersions of the add optical signals with the respective bit rates. The add controller selects a link through which an add optical signal is to be passed for dispersion compensation, and sends the signal to the N×M wavelength selective switch via the selected link.

16 Claims, 11 Drawing Sheets

OTHER PUBLICATIONS

International Search Report mailed Jun. 26, 2007 in corresponding PCT Application No. PCT/JP2007/055403.

Michael Vasilyev et al., *Transparent Ultra-Long-Haul DWDM Networks With "Broadcast-and-Select" OADM/OXC Architecture*, Journal of Lightwave Technology, vol. 21, No. 11, pp. 2661-2672, Nov. 2003 (IEEE).

European Search Report in Application No. 07738848.6 dated Jun. 1, 2012.

* cited by examiner

OPTICAL TRANSMISSION APPARATUS

This application is a continuing application, filed under 35 U.S.C. §111(a), of International Application PCT/JP2007/055403, filed Mar. 16, 2007.

FIELD

The embodiments discussed herein are related to optical transmission apparatus.

BACKGROUND

In cases where high-speed, large-capacity optical transmission paths are constructed by using optical transmission technology, a nonlinear transmission characteristic called chromatic dispersion exerts a great influence on the performance.

Chromatic dispersion is a phenomenon in which as light is propagated through an optical fiber, its waveforms spread along the time axis. To permit optical signals to be transmitted over a long distance without entailing distortion, the chromatic dispersion caused needs to be sufficiently small.

Meanwhile, in recent years, optical transmission systems have been under development whereby optical signals with different bit rates (e.g., 10 Gb/s and 40 Gb/s) can be transmitted. In such applications, the influence of chromatic dispersion on a 40-Gb/s optical signal is approximately 16 times as much as that of chromatic dispersion on a 10-Gb/s optical signal. Thus, in systems handling 10- and 40-Gb/s optical signals, it is necessary that the chromatic dispersion be efficiently compensated with respect to both of the bit rates.

To compensate chromatic dispersion, a method is generally adopted in which, for example, dispersion compensation modules (DCMs) tuned to the respective bit rates are inserted into an optical fiber to perform dispersion compensation.

As conventional dispersion compensation techniques, Japanese Laid-open Patent Publication No. 2005-295126 (paragraph nos. [0021] to [0038], FIG. 11) identified below proposes a technique in which a compensation node is arranged in each in-line relaying apparatus, optical signals are subjected to wavelength separation according to bit rates in the compensation node, and an dispersion compensation amount is set with respect to each bit rate.

In optical transmission systems such as the aforementioned ones, multi-wavelength transmission is carried out by using WDM (Wavelength Division Multiplex) technology. Also, control referred to as OADM (Optical Add and Drop Multiplexing) is executed in which, in compliance with a communication request of each node, optical signals of desired wavelengths are inserted (added) into and extracted (dropped) from desired paths.

However, where the dispersion is compensated in conventional optical transmission systems in which optical signals with different bit rates are subjected to OADM, DCMs tuned to the respective bit rates have to be inserted into each add/drop optical fiber via which optical signals are added or dropped, which leads to enlargement of the scale of the system and increase of costs.

Practical application of optical transmission systems for 10- and 40-Gb/s optical signals has just begun at this stage, and a technique for efficiently compensating the chromatic dispersion of the individual bit rates has not been established yet. Accordingly, there has been an urgent demand for techniques applicable to systems for performing OADM control on optical signals with different bit rates and capable of efficiently compensating the chromatic dispersions of the optical signals with the respective different bit rates.

SUMMARY

According to an aspect of the embodiment, an optical transmission apparatus for performing optical transmission while dropping and adding optical signals, including: an optical switching unit including an N×M wavelength selective switch with N input ports and M output ports; an add controller configured to perform add control, wherein provided that add optical signals, which are optical signals to be added, have k different bit rates, the add controller is connected to k (<N) inputs ports, out of the N input ports, and sends the add optical signals to the k input ports; and a drop controller connected to m (<M) output ports, out of the M output ports, for performing drop control on optical signals sent from the m output ports, wherein k links connecting the k input ports of the N×M wavelength selective switch with the add controller have introduced therein dispersion compensators for compensating chromatic dispersions of the add optical signals with the respective bit rates, and wherein the add controller selects one of the links through which the add optical signal is to be passed for dispersion compensation, and sends the add optical signal to the N×M wavelength selective switch via the selected link.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
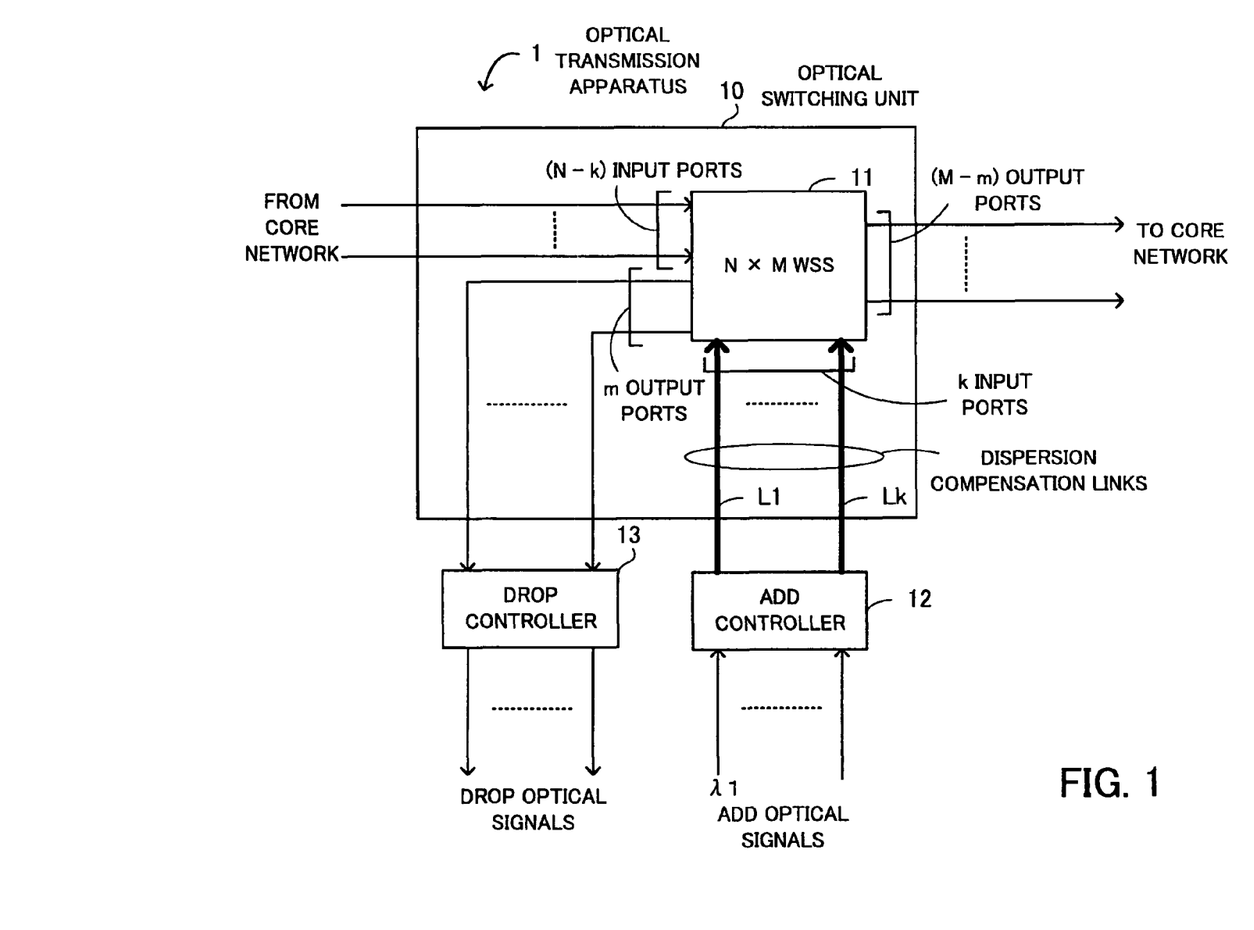
FIG. 1 illustrates the principle of an optical transmission apparatus.

Embodiments of the present invention will be described below with reference to the accompanying drawings, wherein like reference numerals refer to like elements throughout. FIG. 1 illustrates the principle of an optical transmission apparatus. The optical transmission apparatus 1 comprises an optical switching unit 10, an add controller 12, and a drop controller 13, and performs optical transmission while executing OADM by extracting (dropping) and inserting (adding) optical signals. Optical signals of which the transmission is controlled by the optical transmission apparatus 1 are WDM signals.

The optical switching unit 10 includes an N×M wavelength selective switch 11. The N×M wavelength selective switch (hereinafter referred to as WSS) 11 has N input ports and M output ports.

Where add optical signals, which are optical signals to be added, have k different bit rates, the add controller 12 is connected to k (<N) input ports, among the N input ports. The add controller 12 sends the add optical signals to the k input ports to perform add (Add) control. The drop controller 13 is connected to m (<M) output ports, among the M output ports, and performs drop (Drop) control on the optical signals sent from the m output ports.

The N×M WSS 11 receives, at its N−k input ports, optical signals propagated through a core network and outputs optical signals from its M−m output ports to the core network.

The k input ports of the N×M WSS 11 and the add controller 12 are connected by k links L1 to Lk, and the k links L1 to Lk have introduced therein dispersion compensators for compensating chromatic dispersions of the add optical signals with the respective different bit rates.

Also, during the add control for an add optical signal with a certain bit rate, the add controller 12 selects a link with a dispersion compensator tuned to the same bit rate, and sends the add optical signal to the N×M WSS 11 via the selected link.

For example, where an add optical signal λ1 to be added has a bit rate of 40 Gb/s and the link L1 has introduced therein a dispersion compensator tuned to 40 Gb/s, the add controller 12 selects the link L1, so that the add optical signal λ1 is sent to the N×M WSS 11 via the link L1.

The configuration of the optical transmission apparatus 1 will be now described. The following description is based on the assumption that the N×M WSS 11 is a 3×3 WSS (N=3, M=3), handles two different bit rates of 10 Gb/s and 40 Gb/s, has two input ports connected to the add controller 12 (k=2), and has two output ports connected to the drop controller 13 (m=2). Also, in the following, the add controller is referred to as add unit, and the drop controller as drop unit.

Figure 2:
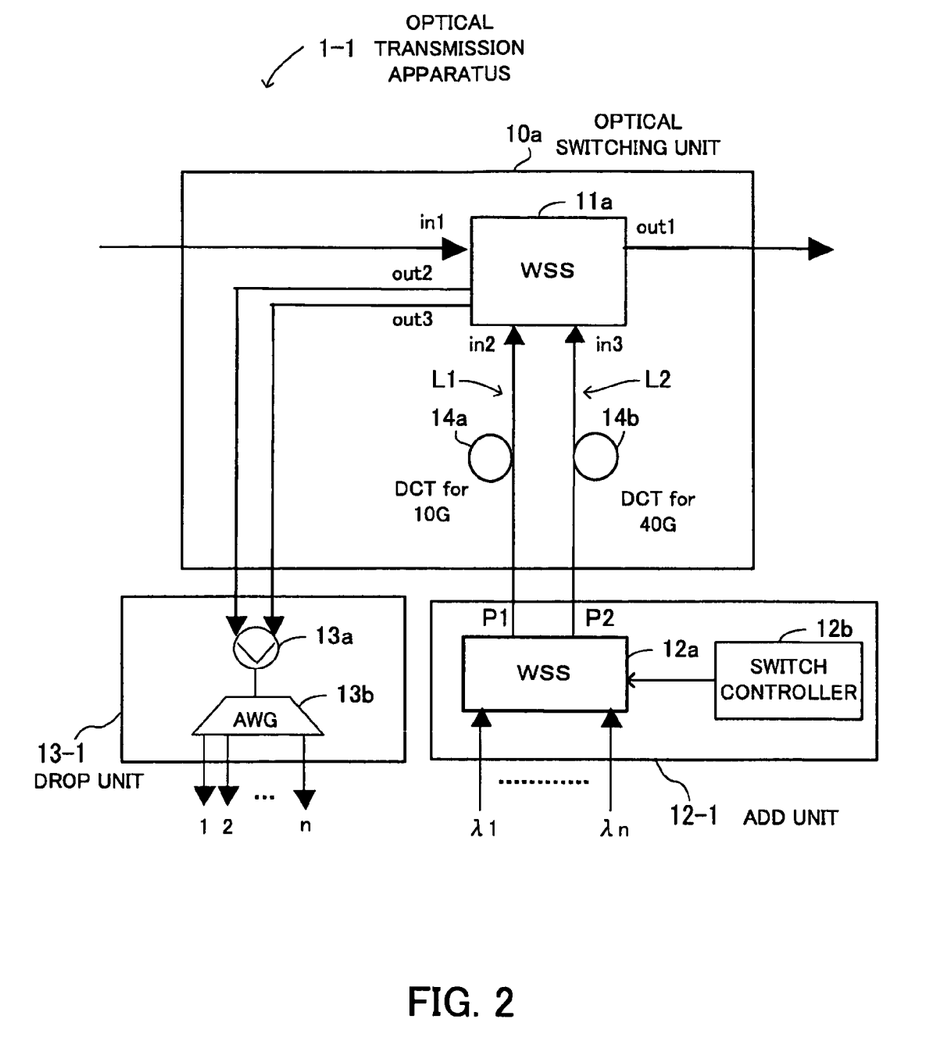
FIG. 2 illustrates the configuration of the optical transmission apparatus.

FIG. 2 illustrates the configuration of the optical transmission apparatus. An optical transmission apparatus 1-1 according to a first embodiment comprises an optical switching unit 10a, an add unit 12-1, and a drop unit 13-1. The optical switching unit 10a includes a 3×3 WSS 11a. The add unit 12-1 includes a WSS 12a and a switch controller 12b. The drop unit 13-1 includes a coupler 13a and an AWG (Arrayed Waveguide Grating; AWG type optical multiplexer/demultiplexer) 13b (in practice, the optical switching unit 10a also includes a switch controller for controlling the WSS 11a, though not illustrated).

Where the add control is performed on add optical signals (hereinafter referred to as add signals) with n different wavelengths and k different bit rates, the add unit 12-1 includes an n×k WSS with n input ports and k output ports.

In this instance, add signals with two different bit rates (k=2) of 40 Gb/s (hereinafter abbreviated as 40 G) and 10 Gb/s (hereinafter abbreviated as 10 G) are received, and therefore, the WSS 12a in the add unit 12-1 is an n×2 WSS.

On the other hand, the WSS 11a receives, through its input port in1, an optical signal propagated through a core network. An input port in2 is input with an add signal arriving via a link L1 connecting the WSS 11a and the add unit 12-1. An input port in3 is input with an add signal arriving via a link L2 connecting the WSS 11a and the add unit 12-1.

After being switched by the WSS 11a, the optical signals are output to the core network from an output port out1 as well as to the drop unit 13-1 from output ports out2 and out3.

The drop unit 13-1 is constituted by an m×1 coupler with m inputs and one output, and a demultiplexer for demultiplexing a drop optical signal (hereinafter referred to as drop signal) output from the m×1 coupler. In this instance, m=2, and therefore, the coupler 13a is a 2×1 coupler while the AWG 13b serving as the demultiplexer is a 1×n AWG with one input and n outputs.

Figure 3:
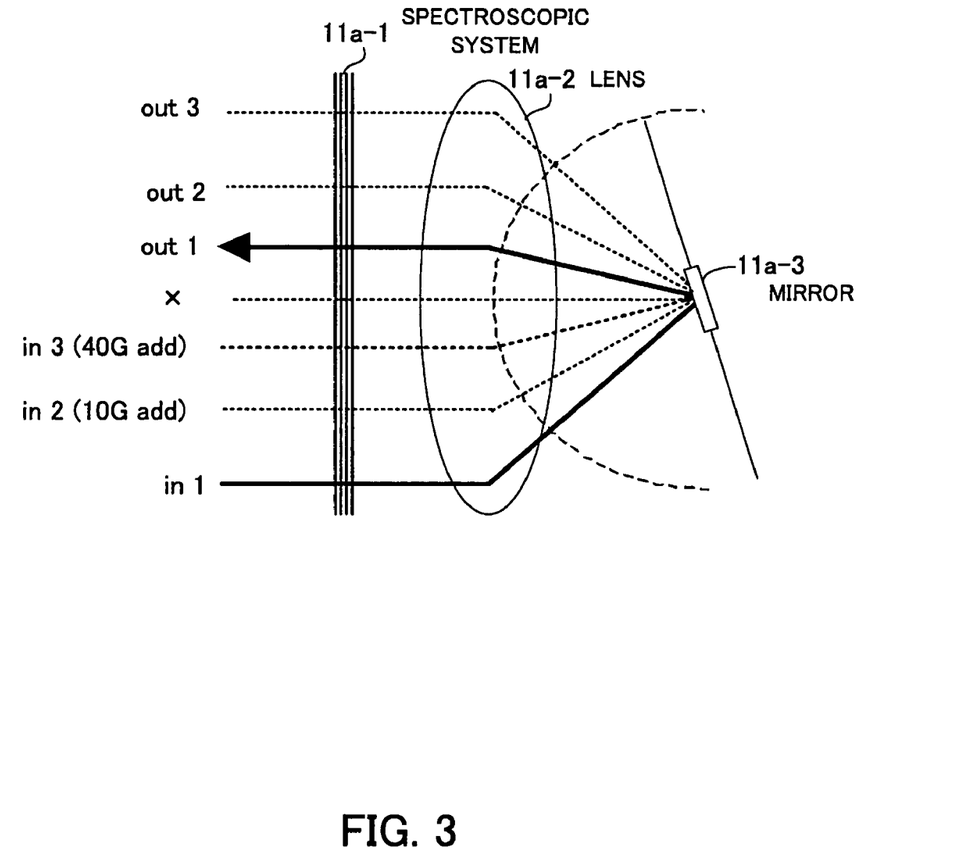
FIG. 3 illustrates a switching operation of a wavelength selective switch (WSS)

Operation of the WSS 11a will be now described. FIG. 3 illustrates a switching operation of the WSS 11a, wherein the optical signal arriving from the core network is passed through to the core network.

The WSS 11a comprises a spectroscopic system 11a-1, a lens 11a-2, and a mirror 11a-3 (mirror 11a-3 is provided for each of the wavelengths to be handled), and incident light input from one input port is output via one of the output ports. For the mirror 11a-3, a MEMS (Micro Electro Mechanical Systems) is generally used, and the output port is switched by varying the angle of the mirror 11a-3.

In the case of FIG. 3, the mirror 11a-3 is tilted such that the input signal from the input port in1 is output via the output port out1. In the WSS, two input signals input from adjacent ports are always output via adjacent output ports for structural reasons. Accordingly, when an output port via which one of the two input signals is to be output is determined, the output port for the other input signal is automatically determined.

For example, if the input signal from the input port in1, which is an outward one out of the two input ports in1 and in2 of the WSS 11a, is output via the output port out1, the input signal from the inwardly located input port in2 is output via the adjacent output port (in the illustrated example, though, there is no such output port) located inward of the output port out1 on condition that the tilt angle of the mirror 11a-3 remains unchanged (the signal input from the input port in2 is not output via the output port out2 or out3).

Figure 4:
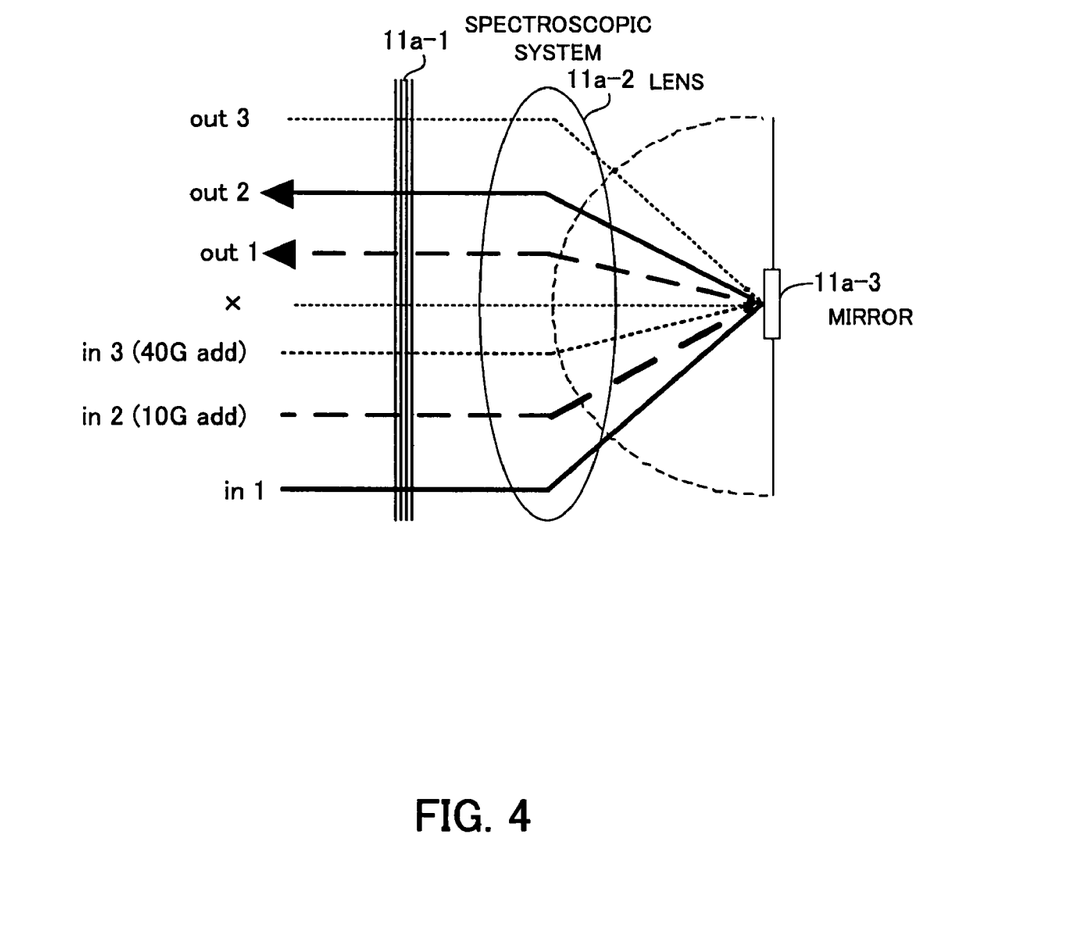
FIG. 4 also illustrates the switching operation of the WSS.

FIG. 4 also illustrates a switching operation of the WSS 11a, wherein the optical signal arriving from the core network is dropped and a 10-G add signal is output to the core network.

In the case illustrated in FIG. 4, the mirror 11a-3 is tilted such that the input signal from the input port in1 is output via the output port out2. At this time, since the input signal from the input port in1, which is an outward one out of the two input ports in1 and in2, is output via the output port out2, the input signal (10-G add signal) from the inwardly located input port in2 is output via the adjacent output port out1 located inward of the output port out2 on condition that the tilt angle of the mirror 11a-3 remains unchanged.

Figure 5:
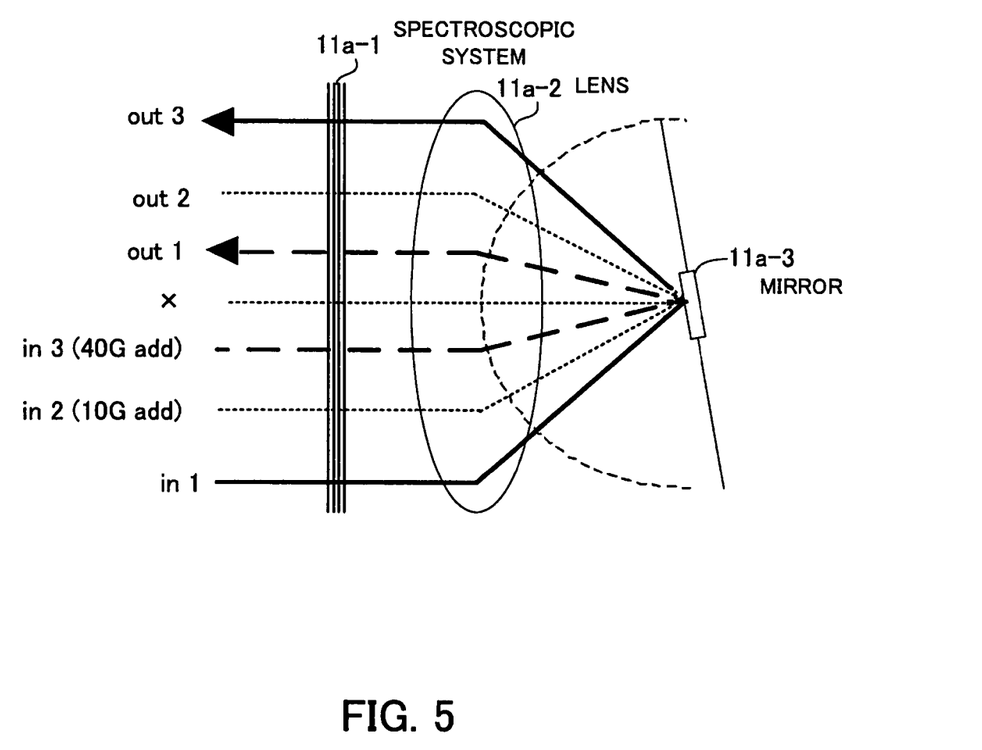
FIG. 5 illustrates the switching operation of the WSS.

FIG. 5 illustrates a switching operation of the WSS 11a, wherein the optical signal arriving from the core network is dropped and a 40-G add signal is output to the core network.

In the case of FIG. 5, the mirror 11a-3 is tilted such that the input signal from the input port in1 is output via the output port out3. At this time, since the input signal from the input port in1, which is an outward one out of the two input ports in1 and in3, is output via the output port out3, the input signal (40-G add signal) from the input port in3, which is located inward of the input port in1 with the input port in2 therebetween, is output via the output port out1, which is located inward of the output port out3 with the output port out2 therebetween, on condition that the tilt angle of the mirror 11a-3 remains unchanged (namely, incident light from a certain input port is output via the output port located symmetrically to the input port).

The add control will be now explained. Referring again to FIG. 2, the n×2 WSS 12a in the add unit 12-1 receives optical signals with wavelengths λ1 to λn (in this instance, the optical signals with the wavelengths λ1 to λn have a bit rate of either 10 G or 40 G). In accordance with instructions from the switch controller 12b, the WSS 12a switches the optical signals to the output port P1 or P2.

The optical fiber link L1 connected to the output port P1 has introduced therein a dispersion compensator tuned to 10 G, and the optical fiber link L2 connected to the output port P2 has introduced therein a dispersion compensator tuned to 40 G. Specifically, in the example illustrated in FIG. 2, the link L1 is provided with a DCT (Dispersion Compensation Transmitter) 14a tuned to 10 G, and the link L2 is provided with a DCT 14b tuned to 40 G (where the optical signals with a bit rate of 10 G experience only small chromatic dispersion and fulfill required transmission characteristics, the DCT 14a may be omitted).

The switch controller 12b is informed in advance of the bit rates of the individual wavelengths to be added, and controls the WSS 12a so that the output port P1 or P2 may be selected in accordance with the wavelength to be added.

Provided that the add optical signals with the odd-numbered wavelengths λ1, λ3, λ5, . . . have a bit rate of 10 G, for example, the switch controller 12b controls the mirror in the WSS 12a so that the add optical signals with the wavelengths λ1, λ3, λ5, . . . may be switched to the output port P1.

Where the add optical signals with the even-numbered wavelengths λ2, λ4, λ6, . . . have a bit rate of 40 G, the switch controller 12b controls the mirror in the WSS 12a so that the add optical signals with the wavelengths λ2, λ4, λ6, . . . may be switched to the output port P2.

The WSS 12a performs switching in accordance with instructions from the switch controller 12b. The 10- and 40-G WDM optical signals output from the WSS 12a pass through the respective DCTs 14a and 14b whose dispersion compensation values are optimized, whereby pre-dispersion compensations are collectively carried out.

Figure 6:
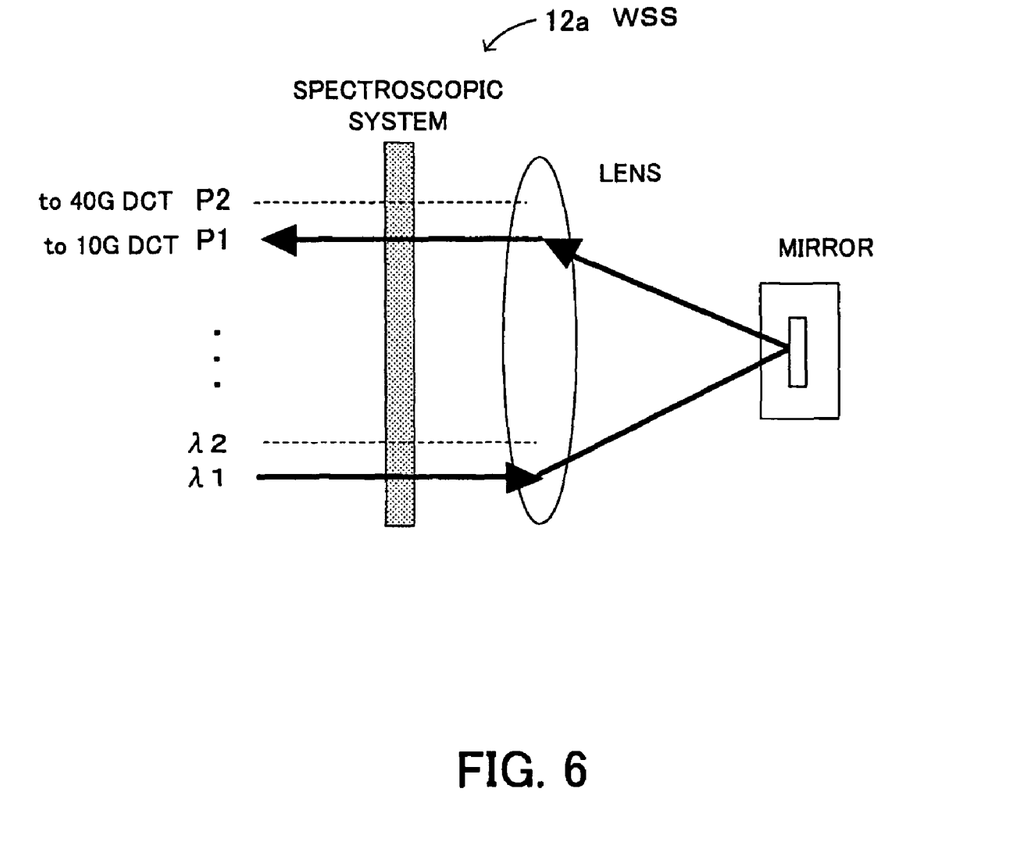
FIG. 6 illustrates an exemplary switching operation of a WSS.
Figure 7:
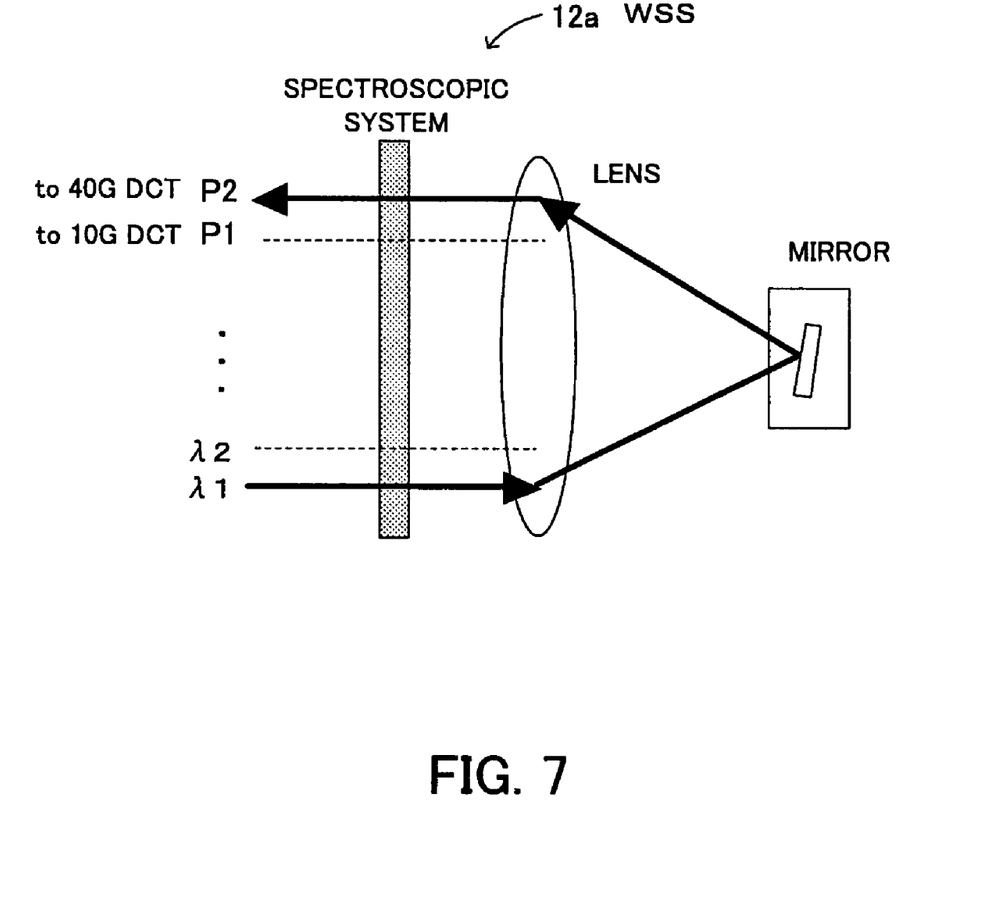
FIG. 7 also illustrates an exemplary switching operation of the WSS.

FIGS. 6 and 7 each illustrate an exemplary switching operation of the WSS 12a. FIG. 6 exemplifies the case where the add optical signal with the wavelength λ1 has a bit rate of 10 G and is output from the output port P1. If the add optical signal with the wavelength λ2 also has a bit rate of 10 G, the tilt angle of the mirror is varied to allow the add optical signal with the wavelength λ2 to be output from the output port P1.

FIG. 7 exemplifies the case where the add optical signal with the wavelength λ1 has a bit rate of 40 G and is output from the port P2. If the add optical signal with the wavelength λ2 also has a bit rate of 40 G, for example, the tilt angle of the mirror is varied such that the optical signal with the wavelength λ2 is output from the output port P2.

In this manner, the DCTs 14a and 14b for compensating the dispersions of optical signals with bit rates of 10 G and 40 G, respectively, are introduced into the links L1 and L2 through which the optical signals with the respective bit rates are passed, and the add unit 12-1 performs switching to select one of the links L1 and L2 whose dispersion compensation is tuned to the same bit rate as that of the signal to be added so that the add signal may be sent to the WSS 11a via the selected link.

In conventional OADM systems, DCTs tuned to respective bit rates are arranged in each optical fiber link to compensate dispersions. By contrast, the configuration described above enables collective and efficient dispersion compensation, making it possible to downscale the system and reduce costs.

The drop control will be now described. In FIG. 2, the coupler 13a, which has two inputs connected to the outputs ports out2 and out3, respectively, of the WSS 11a, combines the optical signals from the output ports out2 and out3, and outputs the combined signal to the AWG 13b. The AWG 13b demultiplexes the output signal from the coupler 13a into multiple signals and outputs (drops) the demultiplexed signals.

In the operation of the WSS 11a explained above with reference to FIG. 4, the optical signal input from the input port in1 is output via the output port out2, and in the operation of the WSS 11a explained above with reference to FIG. 5, the optical signal input from the input port in1 is output via the output port out3.

Thus, the output port via which the optical signal input from the input port in1 is output varies depending on the tilted state (switched state) of the mirror in the WSS 11a. Since the output signals from the output ports out2 and out3 are coupled by the coupler 13a, however, the optical signal can be dropped regardless of whether the optical signal has been output from the output port out2 or out3.

Figure 8:
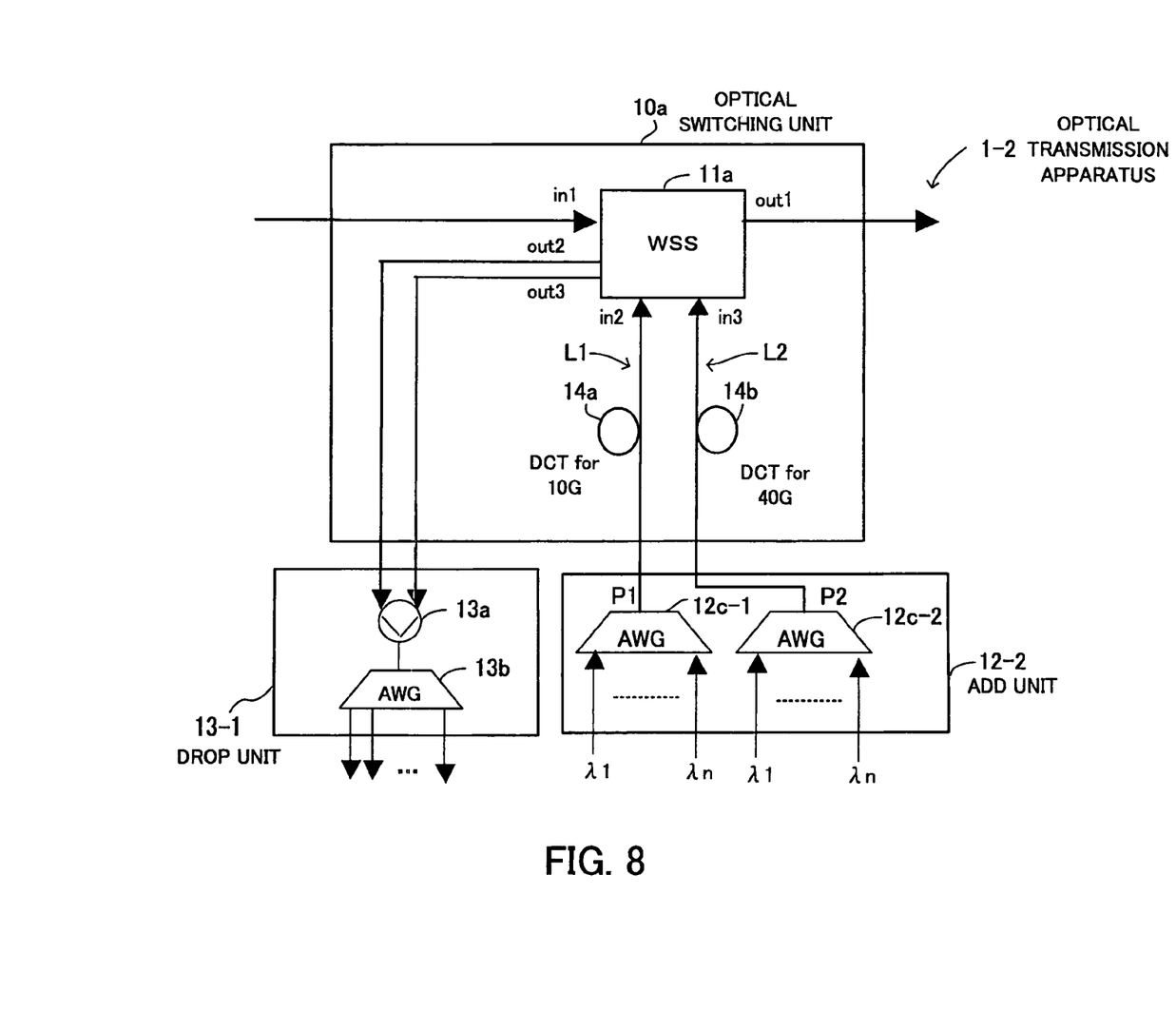
FIG. 8 illustrates the configuration of another optical transmission apparatus.

A second embodiment will be now described. In the following, elements already explained are denoted by the same reference numerals as those used in the above, and description of such elements is omitted. FIG. 8 illustrates the configuration of an optical transmission apparatus. The optical transmission apparatus 1-2 of the second embodiment comprises the optical switching unit 10a, an add unit 12-2, and the drop unit 13-1.

Where the add control is performed on k bit rate groups of optical signals having k different bit rates, respectively, and each including n different wavelengths, the add unit 12-2 includes k AWGs, each being an n×1 AWG with n input ports and one output port.

In the illustrated example, there are two different bit rates 10 G and 40 G, namely, k=2, and therefore, two n×1 AWGs 12c-1 and 12c-2 are provided. The AWG 12c-1 is connected to the link L1, and the AWG 12c-2 is connected to the link L2.

The AWG 12c-1 multiplexes 10-G optical signals with wavelengths λ1 to λn to generate a multiplexed signal to be added, and sends the multiplexed signal to the WSS 11a via the link L1 provided with the DCT 14a for compensating the dispersion of 10-G optical signals. The AWG 12c-2 multiplexes 40-G optical signals with wavelengths λ1 to λn to generate a multiplexed signal to be added, and sends the multiplexed signal to the WSS 11a via the link L2 provided with the DCT 14b for compensating the dispersion of 40-G optical signals.

Figure 9:
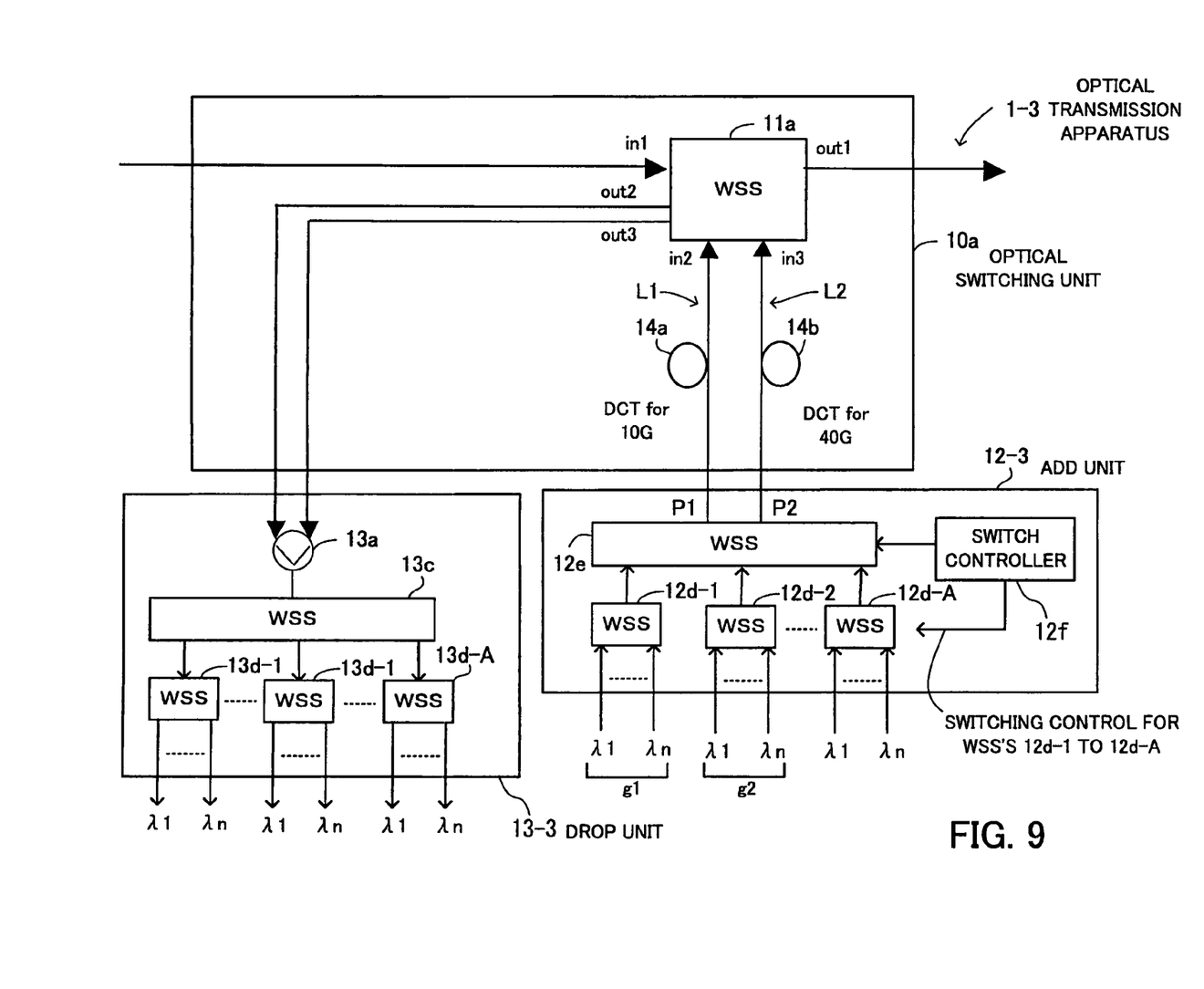
FIG. 9 illustrates the configuration of still another optical transmission apparatus.

A third embodiment will be now described. FIG. 9 illustrates the configuration of an optical transmission apparatus. The optical transmission apparatus 1-3 of the third embodiment comprises the optical switching unit 10a, an add unit 12-3, and a drop unit 13-3.

Where the add control is performed on A wavelength groups of optical signals each group including n different wavelengths and having one of k different bit rates, the add unit 12-3 comprises A WSSs, each being an n×1 WSS with n input ports and one output port, and one A×k WSS with A input ports and k output ports.

In the illustrated example, the bit rates used are 10 G and 40 G, that is, k=2, and therefore, the add unit 12-3 includes A WSSs 12d-1 to 12d-A, each being an n×1 WSS, one A×2 WSS 12e, and a switch controller 12f for controlling the switching of the WSS 12e and WSSs 12d-1 to 12d-A (in practice, each of the optical switching unit 10a and the drop unit 13-3 also includes a switch controller for controlling the switching of the WSS(s), though not illustrated).

Each of the WSSs 12d-1 to 12d-A switches the corresponding wavelength group including wavelengths λ1 to λn, and outputs the switched WDM signal from the single output port to the WSS 12e.

The switch controller 12f is informed in advance of the bit rates of the wavelength groups to be added, and controls the WSS 12e so that the output port P1 or P2 may be selected in accordance with the bit rate.

For example, where the wavelength group (group g1) switched by the WSS 12d-1 has a bit rate of 10 G, the switch controller 12f controls the mirror in the WSS 12e so that the wavelength group g1 to be added may be switched to the output port P1.

Also, where the wavelength group (group g2) switched by the WSS 12d-2 has a bit rate of 40 G, the switch controller 12f controls the mirror in the WSS 12e such that the wavelength group g2 to be added is switched to the output port P2.

The WSS 12e carries out the switching operation in accordance with instructions from the switch controller 12f. The 10- and 40-G WDM optical signals output from the WSS 12e pass through the respective DCTs 14a and 14b whose dispersion compensation values are optimized, whereby pre-dispersion compensations are collectively performed.

On the other hand, the drop unit 13-3 comprises the coupler 13a, a 1×A WSS 13c, and 1×n WSSs 13d-1 to 13d-A. The coupler 13a, which has two inputs connected to the output ports out2 and out3, respectively, of the WSS 11a, combines the optical signals from the output ports out2 and out3, and outputs the combined signal to the WSS 13c. The WSS 13c receives the output signal from the coupler 13a and outputs switched signals. Each of the WSSs 13d-1 to 13d-A receives the output signal from the WSS 13c and outputs (drops) the switched wavelength group.

Figure 10:
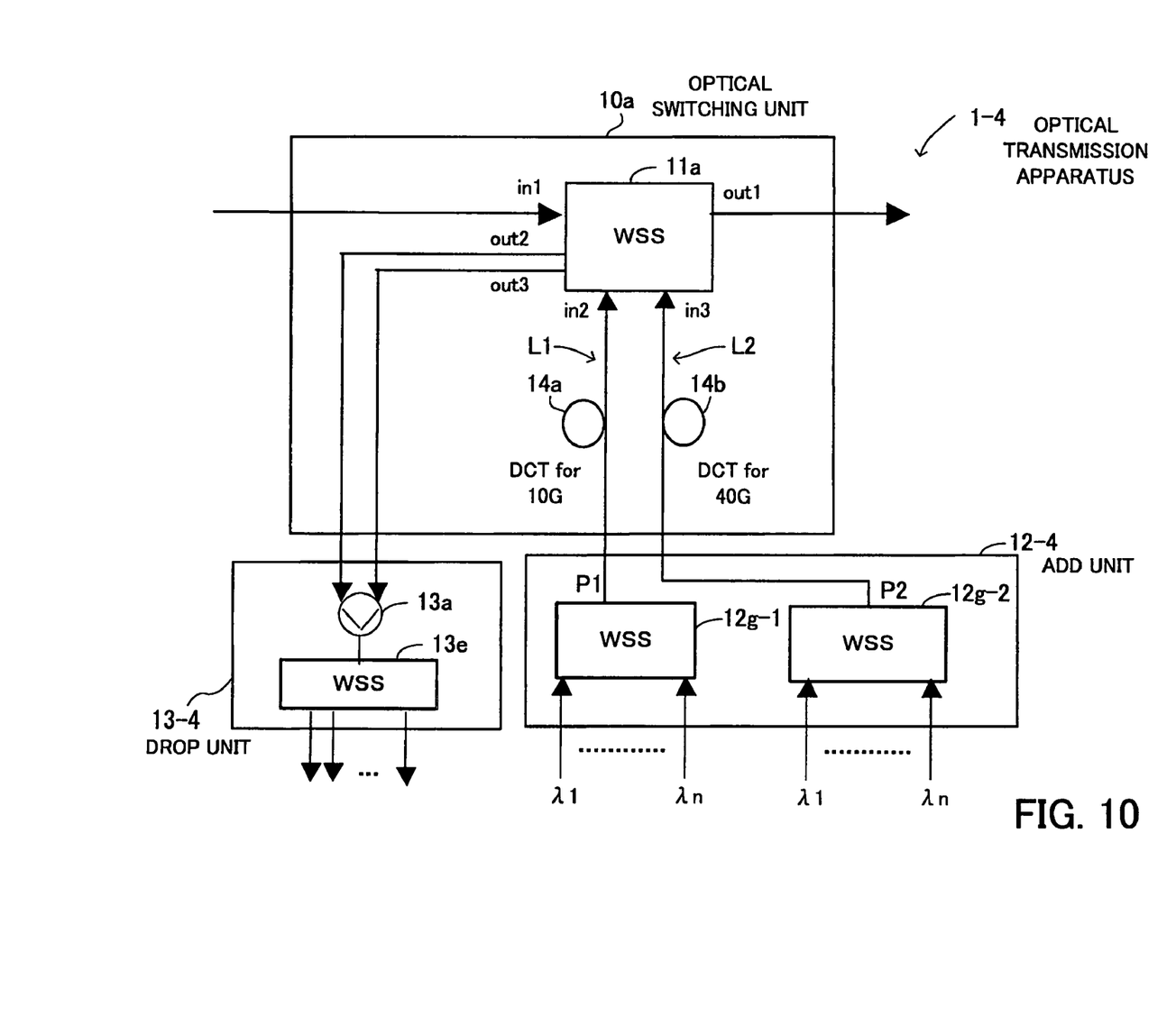
FIG. 10 illustrates the configuration of yet another optical transmission apparatus.

A fourth embodiment will be now described. FIG. 10 illustrates the configuration of an optical transmission apparatus. The optical transmission apparatus 1-4 according to the fourth embodiment comprises the optical switching unit 10a, an add unit 12-4, and a drop unit 13-4 (each of the optical switching unit 10a, the add unit 12-4 and the drop unit 13-4 includes a switch controller, though not illustrated).

Where the add control is performed on low bit rate add signals, which are add optical signals including "a" different wavelengths and having a low bit rate, and high bit rate add signals, which are add optical signals including "b" different wavelengths and having a high bit rate, the add unit 12-4 includes a low bit rate WSS having "a" input ports and one output port and having a narrow transmission bandwidth, and a high bit rate WSS having "b" input ports and one output port and having a broad transmission bandwidth.

In the illustrated example, a=b=n, a WSS 12g-1 for adding signals with a bit rate of 10 G corresponds to the low bit rate WSS with a narrow transmission bandwidth, and a WSS 12g-2 for adding signals with a bit rate of 40 G corresponds to the high bit rate WSS with a broad transmission bandwidth.

In this manner, a narrow band WSS, which is low in cost, is used for the low bit rate add signals, and a broad band WSS, which is high in cost, is used for the high bit rate add signals. By using WSSs with different transmission bandwidths to constitute the add unit, it is possible to reduce costs.

The add operation is executed as follows: The 10-G WDM signal switched and output from the WSS 12g-1 passes through the DCT 14a of which the dispersion compensation value is optimized for 10 G, whereby collective pre-dispersion compensation is performed. The 40-G WDM signal switched and output from the WSS 12g-2 passes through the DCT 14b whose dispersion compensation value is optimized for 40 G, whereby collective pre-dispersion compensation is carried out.

The drop operation is performed as follows: The coupler 13a, of which the two inputs are connected to the output ports out2 and out3, respectively, of the WSS 11a, combines the optical signals sent from the output ports out2 and out3 and outputs the combined signal to a WSS 13e. The WSS 13e receives the output signal from the coupler 13a and outputs (drops) the switched signal.

The following describes a modification of the optical transmission apparatus 1. In the optical transmission apparatus 1 illustrated in FIG. 1, the dispersion compensators are tuned to the respective bit rates. In the modification, the dispersion compensators are tuned to respective transmission distances over which add signals travel before reaching the add unit (in order to compensate the chromatic dispersions caused over the respective transmission distances). The transmission distance may be calculated in terms of the number of transmission spans.

Figure 11:
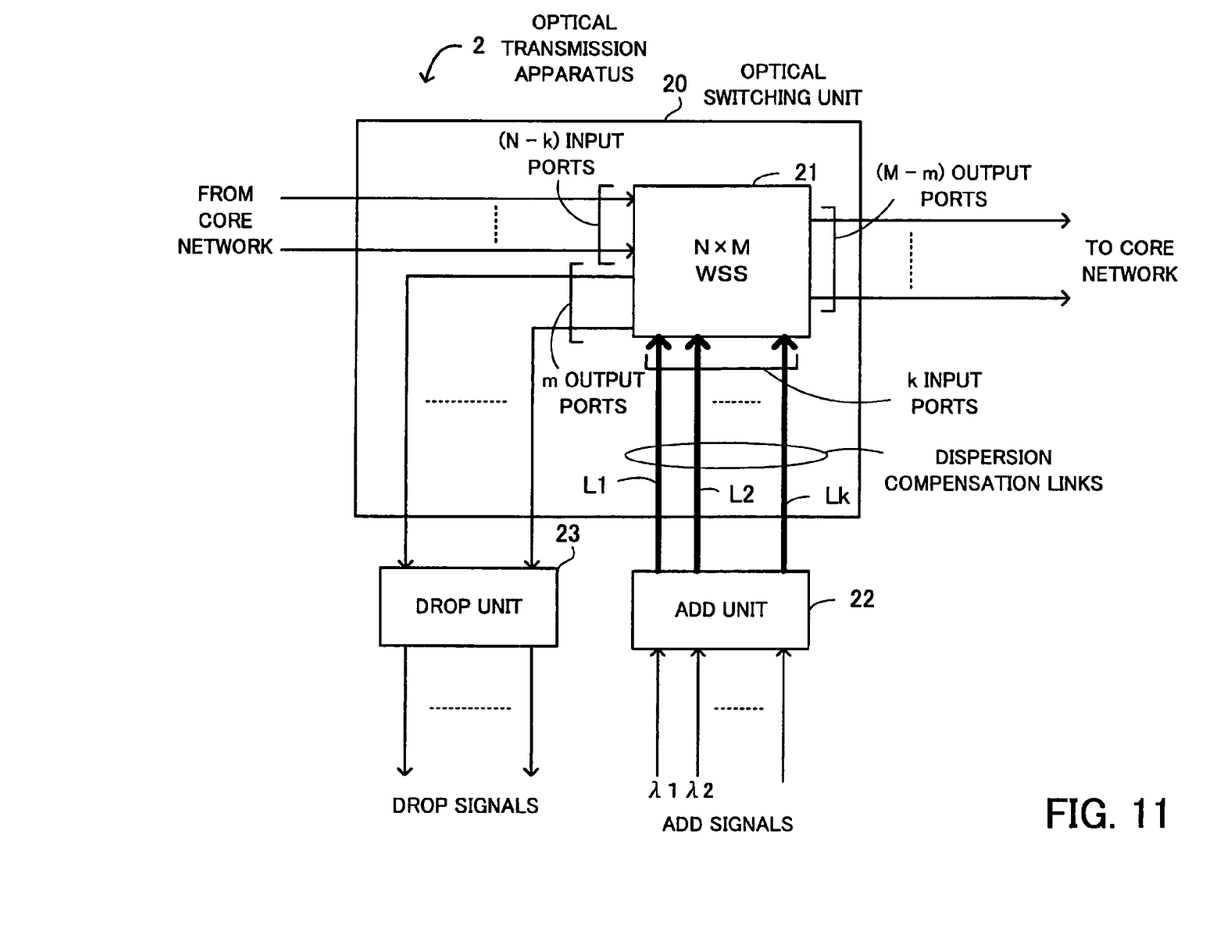
FIG. 11 illustrates a modification of the optical transmission apparatus.

FIG. 11 illustrates the modification of the optical transmission apparatus. The optical transmission apparatus 2 comprises an optical switching unit 20, an add unit 22, and a drop unit 23, and performs optical transmission while executing OADM by extracting (dropping) and inserting (adding) optical signals. Optical signals of which the transmission is controlled by the optical transmission apparatus 2 are WDM signals.

The optical switching unit 20 includes an N×M WSS 21. Where there are k different levels of chromatic dispersion caused depending on the transmission distance of add signals, the add unit 22 is connected to k (<N) input ports, out of the N input ports, of the WSS 21 and sends the add signals to the k input ports to carry out the add control. The drop unit 23 is connected to m (<M) output ports, out of the M output ports, of the WSS 21 and performs the drop control on the optical signals sent from the m output ports.

The add unit 22 is connected to the k input ports of the WSS 21 by k links, and the k links have introduced therein dispersion compensators tuned to the respective levels of chromatic dispersion that occur depending on the transmission distance. The add unit 22 selects a link through which an add signal is to be passed for the dispersion compensation, and sends the add signal to the WSS 21 via the selected link.

For example, if an add signal λ1 to be added reaches the add unit 22 after traveling along an optical fiber over a transmission distance D1 (km), a dispersion compensator for compensating the chromatic dispersion caused over the transmission distance D1 (km) is introduced into the link L1, and when adding the add signal λ1, the add unit 22 selects the link L1. Accordingly, as the add signal λ1 passes through the link L1, its chromatic dispersion is compensated on the way to the WSS 21.

Also, if an add signal λ2 to be added reaches the add unit 22 after traveling along an optical fiber over a transmission distance D2 (km), a dispersion compensator for compensating the chromatic dispersion caused over the transmission distance D2 (km) is introduced into the link L2, and when adding the add signal λ2, the add unit 22 selects the link L2. Consequently, as the add signal λ2 passes through the link L2, its chromatic dispersion is compensated on the way to the WSS 21.

In this manner, the k links connecting the k input ports of the WSS 21 with the add unit 22 may be provided with dispersion compensators for compensating the respective different levels of chromatic dispersion that the add signals experience while traveling over the respective transmission distances before reaching the add unit, instead of the dispersion compensators tuned to the respective bit rates. The optical switching unit 20, add unit 22 and drop unit 23 of the modification may be configured in the same manner as those of the first to fourth embodiments described above. The optical transmission apparatus 2 according to the modification differs from the optical transmission apparatus 1 only in the concept of what type of dispersion compensation is introduced into the links L1 to Lk.

The optical transmission apparatus includes the N×M wavelength selective switch, and the add controller connected to k (<N) input ports, out of the N input ports, for sending the add optical signals to the k input ports to perform the add control. The k links connecting the k input ports of the N×M wavelength selective switch with the add controller have introduced therein dispersion compensators for compensating the chromatic dispersions of the add optical signals with the respective bit rates, and a link through which the add optical signal is to be passed for dispersion compensation is selected to perform the add control. With this configuration, the optical transmission apparatus can be reduced in scale and yet the dispersion can be efficiently compensated during the OADM control of optical signals with different bit rates.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. An optical transmission apparatus for performing optical transmission while dropping and adding optical signals, comprising:
   an optical switching unit including an N×M wavelength selective switch with N input ports and M output ports;
   an add controller configured to perform add control, wherein provided that add optical signals, which are optical signals to be added, have k different bit rates, the add controller is connected to k (<N) inputs ports, out of the N input ports, and sends the add optical signals to the k input ports; and
   a drop controller connected to m (<M) output ports, out of the M output ports, for performing drop control on optical signals sent from the m output ports,
   wherein k links connecting the k input ports of the N×M wavelength selective switch with the add controller have introduced therein dispersion compensators for compensating chromatic dispersions of the add optical signals with the respective bit rates, and
   wherein the add controller selects one of the links through which the add optical signal is to be passed for dispersion compensation, and sends the add optical signal to the N×M wavelength selective switch via the selected link.

2. The optical transmission apparatus according to claim 1, wherein, where the add control is performed on the add optical signals with n different wavelengths having k different bit rates, the add controller includes an n×k wavelength selective switch having n input ports and k output ports.

3. The optical transmission apparatus according to claim 1, wherein, where the add control is performed on k bit rate groups of the add optical signals having k different bit rates, respectively, and each including n different wavelengths, the add controller includes k arrayed waveguide grating type optical multiplexers/demultiplexers, each being an n×1 optical multiplexer/demultiplexer with n input ports and one output port.

4. The optical transmission apparatus according to claim 1, wherein, where the add control is performed on A wavelength groups of the add optical signals each group including n different wavelengths and having one of k different bit rates, the add controller includes A wavelength selective switches, each being an n×1 wavelength selective switch with n input ports and one output port, and one A×k wavelength selective switch with A input ports and k output ports.

5. The optical transmission apparatus according to claim 1, wherein, where the add control is performed on low bit rate add optical signals, which are the add optical signals including "a" different wavelengths and having a low bit rate, and high bit rate add optical signals, which are the add optical signals including "b" different wavelengths and having a high bit rate, the add controller includes a low bit rate wavelength selective switch having "a" input ports and one output port and having a narrow transmission bandwidth, and a high bit rate wavelength selective switch having "b" input ports and one output port and having a broad transmission bandwidth.

6. The optical transmission apparatus according to claim 1, wherein the drop controller includes an m×1 coupler with m inputs and one output, and a demultiplexer configured to demultiplex a drop optical signal output from the m×1 coupler.

7. The optical transmission apparatus according to claim 6, wherein the demultiplexer is one of a 1×c arrayed waveguide grating type optical multiplexer/demultiplexer with one input and c outputs and a 1×c wavelength selective switch with one input and c outputs.

8. The optical transmission apparatus according to claim 6, wherein the demultiplexer includes one 1×c wavelength selective switch with one input and c outputs, and c wavelength selective switches, each being a 1×d wavelength selective switch with one input and d outputs.

9. An optical transmission apparatus for performing optical transmission while dropping and adding optical signals, comprising:
   an optical switching unit including an N×M wavelength selective switch with N input ports and M output ports;
   an add controller configured to perform add control, wherein provided that there are k different levels of chromatic dispersion caused depending on transmission distance of add optical signals which are optical signals to be added, the add controller is connected to k (<N) inputs ports, out of the N input ports, and sends the add optical signals to the k input ports; and
   a drop controller connected to m (<M) output ports, out of the M output ports, for performing drop control on optical signals sent from the m output ports,
   wherein k links connecting the k input ports of the N×M wavelength selective switch with the add controller have introduced therein dispersion compensators tuned to the respective levels of chromatic dispersion that the add optical signals experience while traveling through optical fibers over respective transmission distances before reaching the add controller, and
   wherein the add controller selects one of the links through which the add optical signal is to be passed for dispersion compensation, and sends the add optical signal to the N×M wavelength selective switch via the selected link.

10. The optical transmission apparatus according to claim 9, wherein, where the add control is performed on the add optical signals with n different wavelengths having k different bit rates, the add controller includes an n×k wavelength selective switch having n input ports and k output ports.

11. The optical transmission apparatus according to claim 9, wherein, where the add control is performed on k bit rate groups of the add optical signals having k different bit rates, respectively, and each including n different wavelengths, the add controller includes k arrayed waveguide grating type optical multiplexers/demultiplexers, each being an n×1 optical multiplexer/demultiplexer with n input ports and one output port.

12. The optical transmission apparatus according to claim 9, wherein, where the add control is performed on A wavelength groups of the add optical signals each group including n different wavelengths and having one of k different bit rates, the add controller includes A wavelength selective switches, each being an n×1 wavelength selective switch with n input ports and one output port, and one A×k wavelength selective switch with A input ports and k output ports.

13. The optical transmission apparatus according to claim 9, wherein, where the add control is performed on low bit rate add optical signals, which are the add optical signals including "a" different wavelengths and having a low bit rate, and high bit rate add optical signals, which are the add optical signals including "b" different wavelengths and having a high bit rate, the add controller includes a low bit rate wavelength selective switch having "a" input ports and one output port and having a narrow transmission bandwidth, and a high bit rate wavelength selective switch having "b" input ports and one output port and having a broad transmission bandwidth.

14. The optical transmission apparatus according to claim 9, wherein the drop controller includes an m×1 coupler with m inputs and one output, and a demultiplexer configured to demultiplex a drop optical signal output from the m×1 coupler.

15. The optical transmission apparatus according to claim 14, wherein the demultiplexer is one of a 1×c arrayed waveguide grating type optical multiplexer/demultiplexer with one input and c outputs and a 1×c wavelength selective switch with one input and c outputs.

16. The optical transmission apparatus according to claim 14, wherein the demultiplexer includes one 1×c wavelength selective switch with one input and c outputs, and c wavelength selective switches, each being a 1×d wavelength selective switch with one input and d outputs.

* * * * *